Oct. 7, 1969  H. FREEMAN  3,471,283
REDUCTION OF IRON ORE

Filed Sept. 13, 1965  2 Sheets-Sheet 1

INVENTOR
Horace FREEMAN

ATTORNEY

United States Patent Office 3,471,283
Patented Oct. 7, 1969

3,471,283
REDUCTION OF IRON ORE
Horace Freeman, Cap-de-la-Madeleine, Quebec, Canada, assignor to Freeman Corporation, Cap-de-la-Madeleine, Quebec, Canada
Filed Sept. 13, 1965, Ser. No. 486,888
Claims priority, application Canada, Sept. 15, 1964, 37,549/64
Int. Cl. C21b *11/08, 1/08*
U.S. Cl. 75—40
10 Claims

ABSTRACT OF THE DISCLOSURE

An iron ore charge in the form of a pumpable aqueous paste in a finely divided form is introduced with oxygen into an elongated refractory-lined chamber leading from an exhaust gas exit and charging zone through an intermediate zone to a tapping zone and which has a hearth below the charging zone, the concentrate being reduced and the spent gases exhausted countercurrent to the charge. The charge is a pumpable, flowable thixotropic paste being a mixture of an iron oxide concentrate having a predetermined content of oxygen and non-metallic impurities with an amount of carbonaceous reducing agent effective to combine with the oxygen of the concentrate to form carbon monoxide, a nonoxidizing slag, and an amount of fluxing material effective to form a fusible slag with the non-metallic impurities in the iron oxide and the ash of the carbonaceous material. The charge passes through the chamber, is preheated, dried and partly reduced in the intermediate zone and fiinally reduced in the reducing zone. The oxygen is introduced into the chamber above the hearth in an amount effective to burn the gases evolving from the reduction whereby liquid iron and a protective layer of supernatant liquid slag separates on the hearth. The iron and slag are tapped to keep pace with their formation.

---

This invention relates to the reduction of iron ores to molten cast iron or steel.

As a starting point in explaining the invention, it is observed that iron oxide ores, for example hematites and magnetites, are commonly made available in concentrated finely divided form, by conventional methods. These concentrates are usually sintered into lump form or converted into pellet form to make them convenient to handle and the lumps or pellets constitute the charge which is smelted to metal in orthodox blast or open-hearth furnaces.

According to the present invention, the charge is a pumpable mixture containing the concentrates, a solid carbonaceous reducing agent, a fluxing material, optionally minor amounts of colloidal clay, and water. The charge is injected, in fluid form, into a furnacing zone heated to at least 1000° C. and preferably above the temperature of molten iron and at the same time a stream of oxygen is injected into the furnacing zone into contact with the charge. The reducing agent is proportioned to provide an amount of fixed carbon effective to remove all or part of the oxygen of the concentrate when the mixture is heated to reduction temperature, plus an excess to provide for carburizing the metallic iron which is formed to the desired degree as well as to maintain the resultant slag in a reduced condition. The flux is present in an amount required by the gangue content of the ore. The total amount of water in the feed material is controlled to render the feed mixture thixotropic so that it may be pumped and sprayed. The exact amount of water will vary with the type and physical nature of the ore and accompanying raw materials used, within the range from 25% to 35% by weight. This amount is based on the total weight of the slurry and will include any residual water in the solid raw materials, as received.

The oxygen is metered at a rate adjusted to the input of charge according to the amount of carbon in the charge to be oxidized from carbon monoxide to carbon dioxide, and completely to oxidize any other combustible gases present.

Briefly, the charge, which is subdivided on injection into the furnacing zone, encountering the high furnacing temperature, is rapidly dried as cake on the furnace walls and as droplets falling down through the rising hot gases and is reduced to sponge iron and carbon monoxide. The carbon monoxide reacts with the entering oxygen generating enough heat to melt the sponge iron to molten metal which accumulates on the furnace hearth with a supernatant molten slag. Excess heat in the gases, including any resulting from what combustible volatile materials there may be in the reducing agent, evaporates the water from the mixture and preheats the particles of agglomerated, dried, sprayed material. The metal and slag are removed from the furnace to keep pace with their formation.

In a preferred procedure, which will be described by way of example only, so that the invention may be understood also in its more general aspects, a vertical refractory-lined furnace of circular cross-section is employed to carry out the process. The furnace is first preheated to smelting temperature. Then, the charge is pumped, as a flowable mixture, into the top of the furnace concentrically to a stream of concentrated oxygen and is thus sprayed down the center line partly onto the preheated refractory-lined wall and partly onto the hearth. The charge forms a coating or cake on the wall. Because of the initial high temperature of the wall, the first part of the charge coming into contact with it is reduced to sponge iron and carbon monoxide. The immediate combustion of the monoxide with oxygen then generates sufficient heat to melt the sponge iron to molten metal and to form a liquid slag cover over the metal which accumulates on the hearth. The surface of the charge receives the impact of the heat generated by the combustion of the monoxide while the undersurface is involved in the heat absorbing reduction reaction to sponge iron and monoxide whereby the refractory lining is maintained relatively cool and has long life. The highest temperature is found on the hearth of the furnace where liquid metal and supernatant slag accumulate and from whence they may be removed as desired.

Other types of furnace may be used to carry out the invention as will be explained.

The precise nature of the charge and its preparation, and further particulars of the conditions of the process will be given by way of example in the detailed description to follow. This will be illustrated by the accompanying drawings in which FIGURE 1 is a diagrammatic view showing in elevation and partly in section a prefered apparatus for carrying out the invention, in this case using a vertical type furnace.

Figure 1:
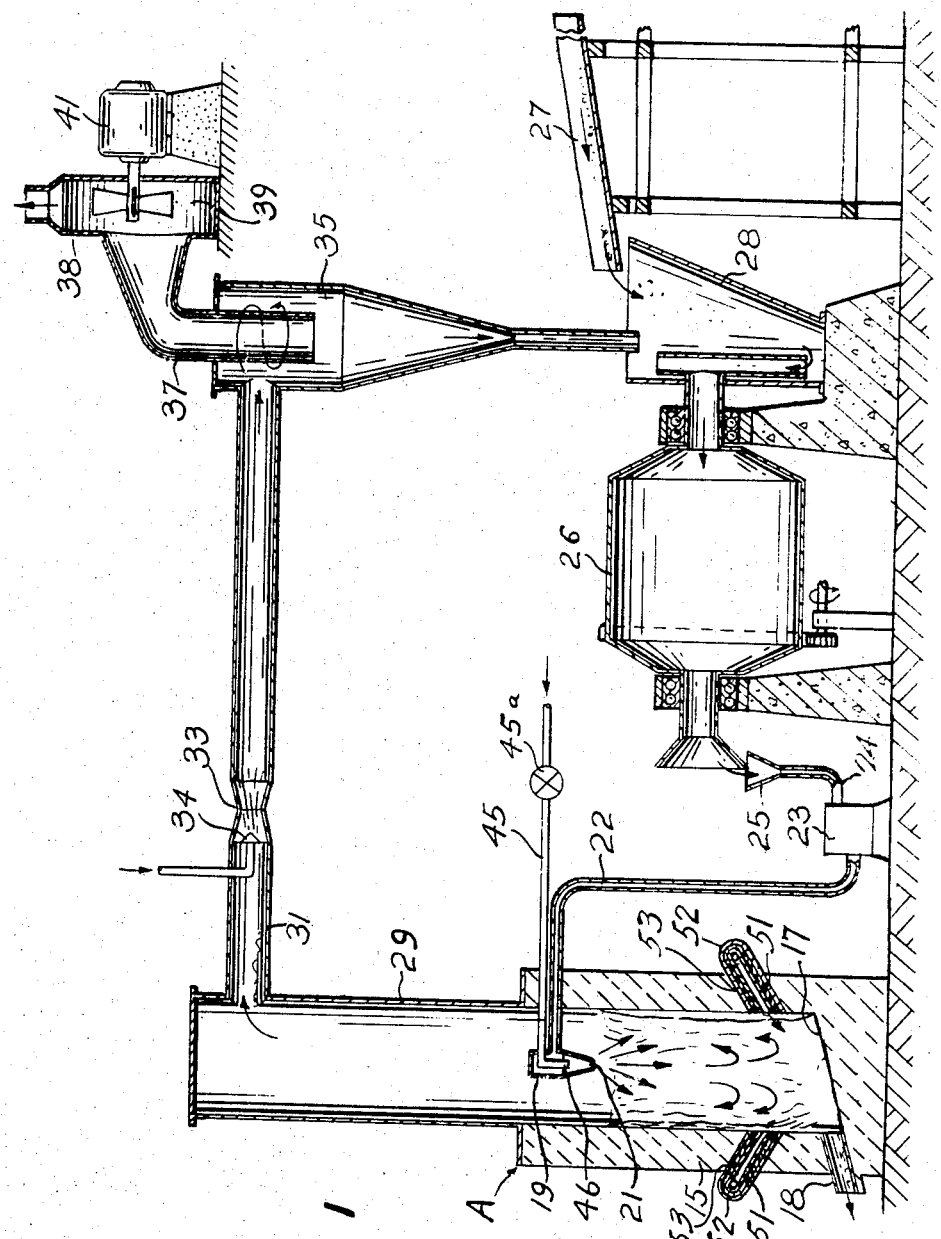

Referring more particularly to FIGURE 1, A represents generally a vertical type furnace having a cylindrical wall 15 surrounding a vertical shaft and having a sloping hearth 17 at the bottom of the shaft. The shaft is shown, by way of example, as cylindrical in horizontal cross-section, but may be square or rectangular. A tapping opening 18 extends through the wall 15 and leads from the hearth 17. The wall 15 is refractory-lined to withstand the high temperature of smelting. Preferably the shaft is lined in its lower or smelting zone with high refractory brick, by choice basic, and in its upper part or preheating zone with less refractory brick. The whole of the brick lining should be well heat-insulated between the brick and its containing steel outer shell.

19 represents a feed head, provided with a nozzle 21, and connected to a supply pipe 22 leading from a slurry pump 23. The pump 23 is supplied through a pipe 24 provided at its upper end with a funnel 25 from a ball mill 26 in which the components of the slurry are intimately ground together. The proportioned mixture of ore concentrate, carbon, flux and water is conveyed by a conveyor 27 to the hopper 28 from whence it proceeds to the ball mill 26.

A flue gas head 29 leads from the top of the shaft of the furnace A and is connected with a laterally extending flue 31 provided with a venturi scrubber made up of a throat 33 and a water spray means 34. The flue 31 leads to the top end of a cyclone dust slurry collector 35, the upper end of the cyclone 35 leads to a pipe 37 and in turn to a casing 38 in which operates a fan 39 driven by a motor 41. 46 represents a gas supply nozzle which extends within the feed head 19 to a position to inject gas into the pumpable mixture entering the head 19 from the pipe 22. 45a is a gas control valve.

Oxygen tuyeres 51 leading from a manifold 52 pass through the wall of the furnace for supplying oxygen to its lower reaches above the hearth. The tuyeres 51 are protected by water jackets 53 and are also connected with means (not shown) for supplying fuel gas for preheating purposes. The oxygen tuyeres 51 are also provided with fuel gas for preheating purposes only.

In operation, the furnace is first preheated to furnacing temperature. Then, the slurry is fed through the head 19 and sprayed through the nozzle 21 (there may be several) at the same time as gas is injected through the supply pipe 45 at the nozzle 46. The gas injected to the nozzle 45 may be entirely oxygen supplied in a measured quantity effective to react with the carbon in the charge as explained elsewhere. Alternatively, the major portion of the oxygen required to react with the carbon in the charge may be supplied through the pipes 51, and a minor proportion supplied through the nozzle 45 to induce the spraying of the pumpable slurry. Where oxygen is injected through the pipes 51, the nozzle 46 may inject propane gas or natural gas or simply slurry. The wet slurry is thrown out onto the wall 15 and under the heat of the refractory lining forms a porous cake on the wall. The size of the wet droplets as they leave the nozzle or nozzles 21 is controlled so that they are dried and preheated before arriving at the smelting hearth at the bottom of the shaft. There is an immediate reaction to form sponge iron and carbon monoxide which evolves from the cake and comes into contact with the oxygen reacting further to generate sufficient heat and temperature to melt the sponge iron to molten metal and to form a liquid slag which drips onto the hearth to form a supernatant layer on the metal also flowing down to the hearth. The combustible carbon monoxide evolved above the hearth is rapidly mixed and burned in that zone by the oxygen from the tuyeres 51. The furnace is tapped of the molten metal and slag continuously or intermittently to keep pace with their formation.

The surface of the charge receives the impact of the heat generated by the combustion of the carbon monoxide while the undersurface of the charge is involved in the heat absorbing reduction reaction to sponge iron and carbon monoxide whereby the refractory lining is maintained relatively cool and has a long life. Higher temperatures are found on the surface of the charge and on the hearth of the furnace where the liquid metal and supernatant slag accumulate and whence they may be removed as desired.

For thermal efficiency in the operation of this process it is essential that the wet charge not only be dried but preheated near to, but below, the temperature at which substantial reduction to iron and production of monoxide begins, circa 850° C., before its arrival in the smelting zone at the bottom of the furnace. All the carbon monoxide evolved from a stoichiometrically proportioned charge will generate enough heat when burned with oxygen to carry out the requirements of the endothermic reducing reaction and to melt the products of metal and slag.

This operation is, in practice, aided by the combustion of any organic volatiles present in the charge provided these are burned in the combustion zone. It is essential, therefore, that most of the carbon monoxide be produced and burned in the lower or smelting zone. The drying of the sprayed droplets is rapidly effected by the very hot gases arising from the smelting zone and it is an important point of this invention that these gases be efficiently cooled in the upper part of the shaft, by the drying of the incoming charge. As they are highly concentrated gases, composed of carbon dioxide and water vapor lacking nitrogen content and therefore of much smaller volume than orthodox blast furnace gases, after cooling they can be handled in simple equipment for the removal and return of dust to the charge preparation system.

The height of the furnace governs the time of fall of the droplets of the charge. Normally a fall of twenty-five feet between the nozzle and the hearth is sufficient to dry and preheat the droplets when these be comparatively large such as one-eighth of an inch diameter.

The droplets readily may be produced to any degree of size required from exceedingly fine to very coarse by injecting the slurry into the furnace through a two fluid type of spray nozzle in which the centre fluid is a controlled high pressure flow of oxygen gas and the outer fluid is the slurry charge. The amount and pressure of oxygen used for this purpose will govern the size of the droplets, but its quantity will not exceed ten percent of the oxygen supplied to the smelting zone, and it will be consumed in burning the combustible volatile gases evolved after the moisture is removed and before the droplets arrive at the hearth. The oxygen used in the spray nozzle is continuously measured or metered, as is the oxygen used for smelting. The fluid ore charged rate is composed, controlled and measured by known means, and kept in balance with the oxygen supply, and in regard to the carbon content of and type of metal required.

Figure 2:
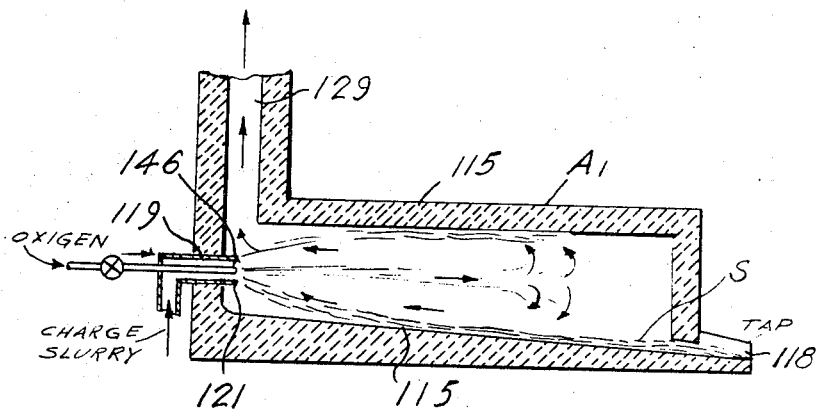
FIGURE 2 is a vertical cross-section through an alternative form of furnace suitable for carrying out the invention, in this case being a horizontal type of furnace having a sloping hearth and provided with means for injecting both the pumpable charge and the oxygen at one end.

FIGURE 2 illustrates a horizontal form of furnace. Similar numbers illustrate similar parts as in FIGURE 1 except that the reference numbers have been raised by 100.

Again the oxygen is injected concentrically to the nozzle 146 to the stream of slurry injected through the head 119 and nozzle 121. The slurry is thrown outwards onto the refractory wall 115 of the furnace and similar conditions evolve as with the furnace of FIGURE 1. In this case, the gases return counter-current to the injected oxygen and pass out through the flue 129. The supernatant slag S and molten metal is tapped through the taphole 118.

Figure 3:
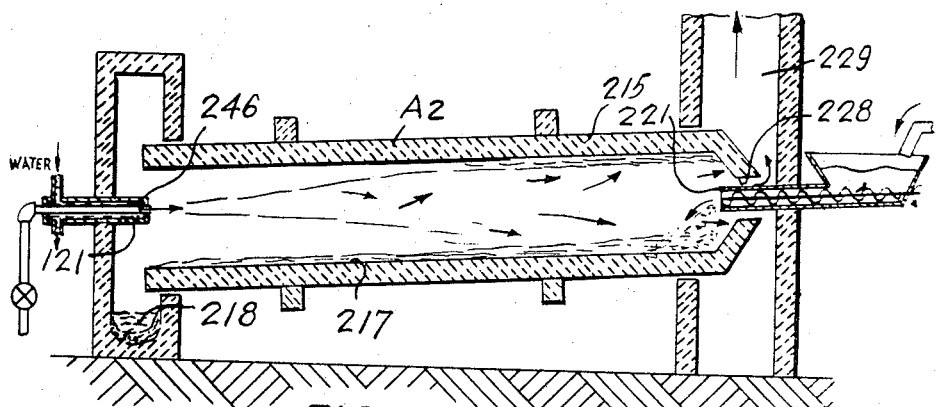
FIGURE 3 is a vertical cross-section through still another form of furnace capable of carrying out the invention, which is a rotating horizontal furnace having a sloping hearth and in which the oxygen is injected at one end and the pumpable charge at the other end.

Still another form of furnace is shown in FIGURE 3. Similar numbers have been used for similar parts as in the previous figures except that they are in the 200's. In this case, the furnace A2 is a rotating furnace which slopes downwards slightly from right to left. In this case, the oxygen is injected through the nozzle 246 at one end while the slurry is introduced through the nozzle 221 at the other end. The exhaust flue 229 is at the end at which the slurry is introduced and the exhaust gases escape through the opening 228 between the nozzle 221 and the wall 215 of the furnace A2 which, in this case, extends inward in a dome. The molten metal and slag are collected on the hearth 217 and flow toward the left to a tap trough 218 from whence they are removed from the furnace.

THE CHARGE

The mineral content of the charge is an iron ore concentrate which has been concentrated to within the range generally of from about 60% to about 70% from an ore which may contain as low as about 25% iron. Generally these are classified as iron oxide ores which may be hematite, magnetite, or any other iron oxide ores which are amenable to concentration by fine grinding. Normally the concentrate comes within a size range from about 100% minus (—) 10 mesh to as fine as about 100% minus (—) 325 mesh (U.S. Standard Screen).

The reducing agent is preferably coal or coke. It is desirable to have coal having a high fixed carbon content. It can be anthracite or bituminous coal in the form of lump, powder or screenings. The amount of coal which is added to the concentrate to make up the charge for the present invention has to be calculated to agree with the amount of fixed carbon required to remove the oxygen from the ores and from the carbonate flux. Carbonaceous materials can be used provided the proper calculations are made to obtain the right amount of fixed carbon. The amount of fixed carbon required is that necessary to reduce the ore to iron and carbon monoxide at quite high temperatures, as for example around 1100° C., plus that required to decompose carbonate flux to carbon monoxide and calcium (or magnesium) oxide.

All concentrates of iron ores contain more or less residual gangue, usually siliceous, so there is added sufficient fluxing material in the form of calcium or magnesium or both as oxides or carbonates (limestone, dolomites) with or without other fluxing additives such as fluorspar or feldspar.

The constituents of the charge (ore, carbon, and flux) are carefully proportioned and water is added sufficient to ensure a total water content of from about 20% to about 30%, preferably about 24% to about 30%. The wet mixture is ground so that it may be continuously discharged from the grinding operation as a paste, preferably with thixotropic properties and of such consistency that it may be conveyed and measured by pumping, for example, to the reduction operation.

The oxygen employed is "concentrated oxygen" having a purity of at least about 95%. Preferably high purity oxygen of about 98% or better is used.

PROCESS CONDITIONS

The oxygen stream may be used in the first instance to spray and subdivide the slurry to get it into the furnace and to form a cake on the refractory wall. The first thing that happens is the caking of the material on the wall. The intense heat of the oxygen flame, that is the oxygen reacting with the carbon monoxide, is concentrated on the surface of the cake, thus protecting the refractory wall of the furnace. Dust is suppressed so that the recovery of dust from the flue gases is minimized. In a preferred procedure, using a vertical shaft furnace, the greater part of the oxygen may be supplied through tuyeres above the hearth arranged to provide a rotating mixing action with the combustible gases. A minor part of the oxygen may then be supplied to effect the spraying or another gas such as natural gas or propane gas may be used for this purpose.

In order that the invention may be more fully understood, specific examples will now be given of an actual preferred procedure according to the invention.

Example 1

A run was carried out in a typical pilot unit having a hearth of forty inches inside diameter at the bottom of a shaft twenty-five feet high having the charging nozzle projecting through the centre top of said shaft and a gas outlet for the cooled gases on the side of the shaft at a point twelve inches below the closed top of the shaft. The exit gases are withdrawn from said outlet through a venturi scrubber thence to cyclone collector and exhaust fan. The wet solids collected in the cyclone are returned to the ball milling circuit. This shaft furnace had a single nozzle at centre top.

The charge was a wet slurry containing:

| | |
|---|---|
| Concentrate containing 2000 lbs. of iron in $Fe_2O_3$ +150 lbs. $SiO_2$ | 3000 |
| Anthracite at 85% carbon content and 5% volatile | 750 |
| Bituminous coal at 51% carbon and 36% volatile | 500 |
| Limestone at 53% calcium oxide content | 500 |
| Water | 2036 |
| Total | 6786 |

This charge was sprayed in through the nozzle at a rate of 20 lbs. per minute. This produced 6 pounds of molten cast iron per minute with a total expenditure of 82 cubic feet of oxygen per minute of which 5% was utilized in controlling the spray at the entrance nozzle.

In starting the operation, the cold furnace was brought to above the temperature of molten iron by burning propane gas with oxygen injected through the water cooled tuyeres. The flames were directed toward the hearth. After the hearth was thoroughly preheated, the propane supply was cut off and the slurry was charged through the nozzle under pressure from a pump, and simultaneously sprayed by means of pressure oxygen supply so that the spray and oxygen were directed down the centre line of the shaft toward the hearth. On arrival at the hot hearth, the dried and preheated droplets were ignited by the oxygen supply from the tuyeres, carbon monoxide was freely liberated and metallic iron was formed together with molten slag. The combustion of the liberated monoxide and of the volatiles from the coal sufficed to maintain the reaction with a charge rate of twenty pounds per minute through the nozzle, equal to the production of six pounds of iron per minute. In less than thirty minutes after the start of this operation it was observed that a mobile bed of hot particles had formed and was kept in motion by the oxygen blasts and by the rapid evolution of carbon monoxide. It was subsequently found by tapping the furnace that molten cast iron had separated from this bed and formed a pool on the hot hearth and it, in turn, was covered by a layer of slag supporting the boiling bed of smelting particles. This metal and slag were removed through a single tap hole and were separated in a ladle. Examination showed that a metal corresponding to cast iron had been formed and separated readily from the slag.

The operation was continued, without difficulty, consuming the ore at the rate of twenty pounds per minute. This showed that the operation can be conducted to yield molten metal and slag using 82 cubic feet of oxygen while yielding 6 pounds of metal per minute without the use of heat other than that supplied by the combustion of the monoxide and the volatile gases from the coal, and that the metal produced was carburised.

Example 2

A specular hematite concentrate passing number 14 U.S. Standard Screen and containing 66.7% of iron was the ore content of the charge. 3000 pounds of such concentrate was mixed into a wet slurry with 947 pounds of anthracite coal containing 85% of fixed carbon and 535 pounds of high grade limestone. The materials were added in the above proportions (dry weight) together with water to provide about 25% water content in the finished slurry or paste emerging from the milling operation as described above. Allowance was made for the water content in the ore, coal and limestone as received. The slurry was pumped into a furnace of the type shown in FIGURE 1 and the furnacing carried out along the lines described in FIGURE 1 to produce 2080 pounds of carburized metal at 4% carbon content.

Example 3

A charge of the following composition was employed:

| | Pounds |
|---|---|
| Ore containing 66.6% iron | 3000 |
| Raw bituminous coal containing 55% carbon and 35% volatile | 1600 |
| Limestone | 600 |
| Water | 2230 |
| Total | 7430 |

This charge composition which contained 30% by weight of water was readily pumped and sprayed, dried, reduced to sponge iron and slag in the molten condition and then tapped from a vertical furnace of the type of FIGURE 1. (End of examples.)

While the above examples are directed to the production of high carbon iron, the process also lends itself to the production, in a single operation, of low carbon steel by careful automatic control of the ore-coal-flux-oxygen feed ratio. However, it is usually preferred to produce a metal containing carbon to be removed in a refining ladle by the use of an oxygen lance, with subsequent heating of the metal, but without the necessity of cooling by the addition of scrap. This method of operation has the advantage of maintaining metal temperature after its removal from the furnace thus facilitating handling and control of quality and permitting of alloy addition when required.

Ores of high purity can by the process of the invention produce steel of high purity continuously without being contaminated with impurities from scrap, which is added as a coolant in existing converter refining by oxygen, of blast furnace metal containing both carbon and silicon. Little or no silicon is reduced, provided that excessive temperature not be allowed to develop.

Among the advantages of the invention are the following. In the first place, pretreatment of the ores after concentration is eliminated since no agglomerating is required to market them. The furnace life may be increased by the fact that in the preferred procedures according to the invention the refractory wall is protected by the deposit of a cake of the feed slurry and its endothermic reaction to sponge iron and carbon monoxide. The heat loss is less than in a blast furnace since the gases produced when oxygen is used in place of air are much lower in volume and no recovery of heat is required as in the stoves of the blast furnace operation. The heat available in the gases from the operation with oxygen is however ample to dry the incoming slurry.

There is full oxidation of the gases within the furnace whereby their total combustible heat is utilized. Furthermore, since the volume of oxygen which is utilized per unit of metal may be only a fraction of the corresponding air used in a blast furnace and the consumption of carbon per ton of metal is less, the total volume of fully oxidized flue gas is reduced to the order of one-fifth of the volume of a corresponding blast furnace operation. Therefore, hot blast stoves are eliminated and the problem of dust recovery is greatly simplified as indicated in FIGURE 1 showing a system for washing the flue gas to recover the wetted dust as slurry to be returned to the milling operation.

The combustion space in the furnace is used highly efficiently, because only pure oxygen or nearly pure oxygen is used and little or no nitrogen occupies the combustion space. Because of the high temperature developed by combustion of the evolved carbon monoxide with the oxygen, the smelting rate is rapid.

Once the furnace has been preheated and the feed started, the smelting operation is self-maintaining. Preheating may be effected by using either solid or gaseous fuel in the furnace and burning it with an oxygen stream without any ore until it has obtained the necessary temperature. Then the ore supply may be started and the extra fuel eliminated.

It is desirable to have the oxygen whirling as it is introduced in order to get good distribution of the oxygen and the slurry. The turbulent oxygen effects good mixing of the gases and good combustion and at the same time good distribution of the slurry on the wall of the furnace.

Irrespective of the furnace design employed to carry out this invention, the process is so conducted that the charge in semi-liquid form is sprayed to form a coating on the wall (which depending on the type of furnace may include the roof) of a smelting chamber which coating is converted by a heat absorbing reaction to iron and carbon monoxide, which monoxide is then burned on the surface and in the combustion space with the oxygen to produce the temperature to melt the iron and the flux and to supply all the heat required for the reduction and melting operations.

One of the main advantages of causing the wet charge to be caked and smelted on the surfaces of the combustion chamber is found in the supression of dust which is formed in large quantity when dry fine particles are smelted in suspension. Reoxidation of reduced fine particles of iron is avoided in this manner. The amount of dust in the free gases leaving the furnace is remarkably low as compared with the dust in the exhaust from an orthodox blast furnace where air is used as the source of oxygen.

The process uses concentrates of iron ore in the fine ground stage as received from the mine concentrating operations and it uses fine coal and fine fluxing material in mixture with water in a single wet grinding operation, thus avoiding large capital investment in agglomerating ore, in coking plant and flux preparation plant. The spraying of the wet mixture to the walls of the reduction chamber by means of the oxygen or by pressure alone insures travel to the walls with the very minimum of dust formation. The dried material has its reacting ingredients in intimate contact. The grinding preparation of the wet slurry and the ability to pump, minimize the mechanical handling of the charge and allow of precise control of the ingredients. The use of oxygen allows complete combustion of the carbon monoxide gases produced within the smelting chamber and without the presence of large volumes of inert gases. This results in high temperature, high smelting rate, and avoids large chemical and sensible heat losses in the flue gas, thus avoiding heavy investment in heat recovery equipment.

The feed head 19 should be provided with a nozzle selected to suit the task at hand, i.e. spraying slurry with a gas entering through the nozzle 46 or simply spraying slurry alone. The nozzle may be equipped with a turbine to provide for subdivision of the slurry for spraying purposes, depending on requirements. The slurry is pumped under pressure and the supply line 22 may be equipped with a meter to assure a constant supply at the desired rate. The exact pressure will depend on factors like the depth of the furnace and the fineness of the spray required.

I claim:

1. A process for producing molten iron and molten slag from an iron oxide concentrate in a furnace having an elongated refractory-lined chamber leading from an exhaust gas flue and charging zone through an intermediate zone to a tapping zone and having a hearth below the charging zone, comprising:

heating said furnace to furnacing temperature, forming a charge of an iron oxide concentrate having a predetermined content of oxygen and non-metallic impurities with an amount of carbonaceous reducing agent effective to combine with the oxygen of the concentrate to form carbon monoxide and a non-oxidizing slag, and an amount of fluxing material effective to form a fusible slag with the non-metallic impurities in the iron oxide and ash of the carbonaceous material, grinding said charge with an amount of water to form a pumpable, sprayable paste, subdividing said charge into finely divided form and injecting it into said charging zone and causing it to pass into and unobstructedly through said chamber whereby it is dried, preheated, and partly reduced in the intermediate zone and finally reduced on the hearth thereby evolving carbon monoxide, at the same time, introducing into the chamber above the hearth into contact with the charge an amount of oxygen effective to burn substantially completely the carbon monoxide evolved and to maintain furnacing temperature whereby liquid iron and a protective layer of supernatant liquid slag separates on the hearth, passing the spent gas freely through the chamber countercurrent and in heat transfer relationship to the subdivided charge whereby it is initially cooled and then passing it out through the flue, and removing the molten metal and slag from the reduction zone to keep pace with its formation.

2. A process, as defined in claim 1, in which the paste is subdivided by the use of a gas entering the charging zone at the same time.

3. A process, as defined in claim 1, in which a minor part of the oxygen is introduced with the paste in the charging zone to subdivide the charge into a spray and the remained in the intermediate zone above the hearth.

4. A process, as defined in claim 1, in which the total amount of water in the paste is within the range from about 25% to about 35% of its total weight.

5. A process, as defined in claim 1, in which the total amount of water in the paste is within the range from about 25% to about 35% of its total weight, and a minor part of the oxygen is introduced with the paste in the charging zone to subdivide the charge into a spray and the remainder in the intermediate zone above the hearth.

6. A process, as defined in claim 1, in which the subdivided charge is directed to strike the heated walls of the furance and form a cake thereon which reacts to evolve sponge iron and carbon monoxide with which the oxygen injected reacts to maintain furnacing temperature.

7. A process, as defined in claim 1, in which the furnace has a horizontally extending rotatable chamber sloping downwardly from the charging zone to the tapping zone and in which the oxygen is injected in the tapping zone countercurrent to the charge.

8. A process, as defined in claim 1, in which the exhaust gases are recovered from the flue, washed to recover solids and the solids combined with said charge.

9. A process as defined in claim 1 in which the furnace is a shaft furnace having a vertical chamber and the charge is injected downwardly into the charging zone located intermediate of the ends of said furnace.

10. A process, as defined in claim 1, in which the furnace employed has a horizontally extending chamber having a hearth sloping downwardly from the charging zone to the tapping zone and the charge is injected in a generally horizontal direction into the charging zone.

References Cited

UNITED STATES PATENTS

| | | | |
|---|---|---|---|
| 441,174 | 11/1890 | Lash | 75—40 |
| 1,461,372 | 7/1923 | Trent | 75—25 X |
| 2,320,206 | 5/1943 | Engel et al. | 75—40 |
| 2,373,244 | 4/1945 | Holz | 75—25 X |
| 2,702,240 | 2/1955 | Rees et al. | 75—26 |
| 2,785,061 | 3/1957 | Teichmann | 75—26 X |
| 2,785,062 | 3/1957 | Teichmann | 75—26 X |
| 2,824,792 | 2/1958 | Rees et al. | 75—26 |
| 2,850,372 | 9/1958 | Planiol | 75—26 |
| 3,126,276 | 3/1964 | Marshall et al. | 75—26 |

L. DEWAYNE RUTLEDGE, Primary Examiner

HENRY W. TARRING II, Assistant Examiner

U.S. Cl. X. R.

75—25